United States Patent
Shpunt et al.

(10) Patent No.: US 9,335,220 B2
(45) Date of Patent: *May 10, 2016

(54) CALIBRATION OF TIME-OF-FLIGHT MEASUREMENT USING STRAY REFLECTIONS

(71) Applicant: PrimeSense Ltd., Tel Aviv (IL)

(72) Inventors: Alexander Shpunt, Tel Aviv (IL); Raviv Erlich, Rehovot (IL)

(73) Assignee: APPLE INC., Cupertino, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 14/302,447

(22) Filed: Jun. 12, 2014

(65) Prior Publication Data

US 2014/0291491 A1 Oct. 2, 2014

Related U.S. Application Data

(63) Continuation-in-part of application No. 13/798,231, filed on Mar. 13, 2013.

(60) Provisional application No. 61/835,653, filed on Jun. 17, 2013, provisional application No. 61/614,029, filed on Mar. 22, 2012.

(51) Int. Cl.
*G01J 11/00* (2006.01)
*G01S 7/481* (2006.01)
(Continued)

(52) U.S. Cl.
CPC .............. *G01J 11/00* (2013.01); *G01S 7/4817* (2013.01); *G01S 7/497* (2013.01); *G01S 17/89* (2013.01); *G02B 5/1814* (2013.01); *G02B 26/101* (2013.01)

(58) Field of Classification Search
CPC .......... G01J 11/00; G01S 17/10; G01S 7/481; G01S 7/4812; G01S 7/4817; G01S 7/4818; G01S 7/484; G01S 7/486; G01S 7/4868; G01S 7/497; G01S 2007/4975; G01S 17/89; G02B 5/1814; G02B 26/101; G03F 7/0005; G01C 3/08; G06T 7/0057; G06T 2207/30196

USPC .............. 359/212.2; 250/214.1; 342/135; 345/419; 356/3.01, 4.04, 34.01, 5.01, 356/5.07, 5.08, 5.1; 367/97; 715/850, 852; 348/135

See application file for complete search history.

(56) References Cited

U.S. PATENT DOCUMENTS 6,229,598 B1  5/2001  Yoshida
6,288,775 B1  9/2001  Tanaka
(Continued)

FOREIGN PATENT DOCUMENTS

DE  102009046911 A1  5/2011
JP  2011118178 A  6/2011
(Continued)

OTHER PUBLICATIONS

International Application # PCT/IB2014/062244 Search Report dated Oct. 30, 2014.
(Continued)

*Primary Examiner* — Scott J Sugarman
*Assistant Examiner* — Ibrahima Diedhiou
(74) *Attorney, Agent, or Firm* — D. Kligler IP Services Ltd.

(57) ABSTRACT

Sensing apparatus includes a transmitter, which emits a beam comprising optical pulses toward a scene, and a receiver, which receives reflections of the optical pulses and outputs electrical pulses in response thereto. Processing circuitry is coupled to the receiver so as to receive, in response to each of at least some of the optical pulses emitted by the transmitter, a first electrical pulse output by the receiver at a first time due to stray reflection within the apparatus and a second electrical pulse output by the receiver at a second time due to the beam reflected from the scene, and to generate a measure of a time of flight of the optical pulses to and from points in the scene by taking a difference between the respective first and second times of output of the first and second electrical pulses.

8 Claims, 4 Drawing Sheets

(51) Int. Cl.
*G01S 7/497* (2006.01)
*G01S 17/89* (2006.01)
*G02B 5/18* (2006.01)
*G02B 26/10* (2006.01)

(56) References Cited

U.S. PATENT DOCUMENTS

| | | | |
|---|---|---|---|
| 7,952,781 B2 | 5/2011 | Weiss et al. | |
| 8,018,579 B1 | 9/2011 | Krah | |
| 2006/0072100 A1* | 4/2006 | Yabe | G01C 3/08 356/4.04 |
| 2006/0215149 A1* | 9/2006 | LaBelle | G01S 7/497 356/5.08 |
| 2011/0141480 A1 | 6/2011 | Meissner | |
| 2011/0228251 A1* | 9/2011 | Yee | G06T 7/0057 356/5.01 |
| 2011/0279648 A1 | 11/2011 | Lutian et al. | |
| 2012/0236379 A1 | 9/2012 | Da Silva et al. | |
| 2013/0207970 A1 | 8/2013 | Shpunt et al. | |
| 2013/0250387 A1 | 9/2013 | Chayat et al. | |

FOREIGN PATENT DOCUMENTS

| | | |
|---|---|---|
| WO | 2012020380 A1 | 2/2012 |
| WO | 2014016794 A1 | 1/2014 |

OTHER PUBLICATIONS

Minifaros, "D1.1-ProjectPresentation", V3.0, 36 pages, Dec. 22, 2010.

International Application PCT/IB2013/051986 Search Report dated Jul. 30, 2013.

Awtar et al, "Two-axis Optical MEMS Scanner," Proceedings of the ASPE Annual Meeting, Paper No. 1800, 4 pages, 2005.

* cited by examiner

CALIBRATION OF TIME-OF-FLIGHT MEASUREMENT USING STRAY REFLECTIONS

CROSS-REFERENCE TO RELATED APPLICATIONS

This application claims the benefit of U.S. Provisional Patent Application 61/835,653, filed Jun. 17, 2013, and is related to U.S. patent application Ser. No. 13/766,801, filed Feb. 14, 2013 (published as U.S. 2013/0207970). This application is a continuation-in-part of U.S. patent application Ser. No. 13/798,231, filed Mar. 13, 2013 (published as U.S. 2013/0250387), claiming the benefit of U.S. Provisional Patent Application 61/614,029, filed Mar. 22, 2012. All of these related applications are assigned to the assignee of the present patent application, and their disclosures are incorporated herein by reference.

FIELD OF THE INVENTION

The present invention relates generally to methods and devices for projection and capture of optical radiation, and particularly to optical time-of-flight (TOF) sensing.

BACKGROUND

Various methods are known in the art for optical 3D mapping, i.e., generating a 3D profile of the surface of an object by processing an optical image of the object. This sort of 3D profile is also referred to as a 3D map, depth map or depth image, and 3D mapping is also referred to as depth mapping.

U.S. Patent Application Publication 2011/0279648 describes a method for constructing a 3D representation of a subject, which comprises capturing, with a camera, a 2D image of the subject. The method further comprises scanning a modulated illumination beam over the subject to illuminate, one at a time, a plurality of target regions of the subject, and measuring a modulation aspect of light from the illumination beam reflected from each of the target regions. A moving-mirror beam scanner is used to scan the illumination beam, and a photodetector is used to measure the modulation aspect. The method further comprises computing a depth aspect based on the modulation aspect measured for each of the target regions, and associating the depth aspect with a corresponding pixel of the 2D image.

U.S. Pat. No. 8,018,579 describes a three-dimensional imaging and display system in which user input is optically detected in an imaging volume by measuring the path length of an amplitude modulated scanning beam as a function of the phase shift thereof. Visual image user feedback concerning the detected user input is presented.

U.S. Pat. No. 7,952,781, whose disclosure is incorporated herein by reference, describes a method of scanning a light beam and a method of manufacturing a microelectromechanical system (MEMS), which can be incorporated in a scanning device.

U.S. Patent Application Publication 2012/0236379 describes a LADAR system that uses MEMS scanning. A scanning mirror includes a substrate that is patterned to include a mirror area, a frame around the mirror area, and a base around the frame. A set of actuators operate to rotate the mirror area about a first axis relative to the frame, and a second set of actuators rotate the frame about a second axis relative to the base. The scanning mirror can be fabricated using semiconductor processing techniques. Drivers for the scanning mirror may employ feedback loops that operate the mirror for triangular motions. Some embodiments of the scanning mirror can be used in a LADAR system for a Natural User Interface of a computing system.

The "MiniFaros" consortium, coordinated by SICK AG (Hamburg, Germany) has supported work on a new laser scanner for automotive applications. Further details are available on the minifaros.eu Web site.

SUMMARY

Embodiments of the present invention that are described hereinbelow provide improved apparatus and methods for depth mapping using a scanning beam. These embodiments are useful particularly (although not exclusively) in enhancing the accuracy of TOF-based measurements, both for depth mapping and for other optical measurement applications.

There is therefore provided, in accordance with an embodiment of the invention, sensing apparatus, including a transmitter, which is configured to emit a beam including optical pulses toward a scene, and a receiver, which is configured to receive reflections of the optical pulses and to output electrical pulses in response thereto. Processing circuitry is coupled to the receiver so as to receive, in response to each of at least some of the optical pulses emitted by the transmitter, a first electrical pulse output by the receiver at a first time due to stray reflection within the apparatus and a second electrical pulse output by the receiver at a second time due to the beam reflected from the scene, and to generate a measure of a time of flight of the optical pulses to and from points in the scene by taking a difference between the respective first and second times of output of the first and second electrical pulses.

In some embodiments, the apparatus includes a scanner, which is configured to scan the beam over a scene, wherein the optical pulses are emitted and received at multiple angular positions of the scanner. The processing circuitry may be configured to generate a depth map of the scene responsively to the time of flight of the optical pulses.

Typically, the first time is indicative of an inherent delay of the receiver in generating the electrical pulses in response to the arrival of the optical pulses, and the processing circuitry is configured to calibrate the time of flight in order to correct for the inherent delay. The processing circuitry may be configured to compute a moving average of the difference between the respective first and second times over a sequence of the optical pulses, and to calibrate the time of flight using the computed average.

There is also provided, in accordance with an embodiment of the present invention, a method for optical sensing, which includes transmitting a beam including optical pulses from a sensing device toward a scene. Reflections of the optical pulses are received in the sensing device, which outputs electrical pulses from the sensing device in response to the received reflections. The electrical pulses include, in response to each of at least some of the transmitted optical pulses, a first electrical pulse output by the sensing device at a first time due to stray reflection within the sensing device and a second electrical pulse output by the sensing device at a second time due to the beam reflected from the scene. A measure of a time of flight of the optical pulses to and from points in the scene is generated by taking a difference between the respective first and second times of output of the first and second electrical pulses.

The present invention will be more fully understood from the following detailed description of the embodiments thereof, taken together with the drawings in which:

DETAILED DESCRIPTION OF EMBODIMENTS

Some embodiments of the present invention that are described hereinbelow provide depth engines that generate 3D mapping data by measuring the time of flight of a scanning beam. A light transmitter, such as a laser, directs short pulses of light toward a scanning mirror, which scans the light beam over a scene of interest within a certain scan range. A receiver, such as a sensitive, high-speed photodiode (for example, an avalanche photodiode) receives light returned from the scene via the same scanning mirror. Processing circuitry measures the time delay between the transmitted and received light pulses at each point in the scan. This delay is indicative of the distance traveled by the light beam, and hence of the depth of the object surface at the scan point. The processing circuitry may use the depth data thus extracted in producing a 3D map of the scene.

Embodiments of the present invention that are described herein provide methods for beam synchronization and calibration that can be used advantageously with the scanners described above, as well as in other types of TOF-based measurement systems. TOF-based scanners are almost inevitably subject to stray reflections, which reflect or otherwise scatter from optical surfaces within the scanner back toward the receiver. In general, such stray reflections are regarded as noise, and designers of the scanners do their best to eliminate them. In the embodiments that are described herein, however, the stray reflections are used intentionally in calibrating the TOF measurements.

A photodetector in the scanning head—typically the same detector that is used to receive light returned from the scene in the sort of scanning head that is described above—receives stray reflections from surfaces in the scanning head each time the transmitter is pulsed. These stray light pulses travel no more than a few centimeters between the transmitter and the photodetector, and the optical time of flight of the stray light pulses should therefore be insignificant—no more than a few tenths of a nanosecond. In practice, however, the measured delay between each electrical pulse that is input to the transmitter and the corresponding pulse that is output from the receiver in response to the stray light will be longer, due to inherent delays in the system electronics. Moreover, this delay typically varies from one scanning head to another and may vary over time (due to changes in temperature, for example) within any given scanning head.

The pulses that are output by the receiver in response to light reflected from the scene are subject to these same inherent delays, which introduce inaccuracy and uncertainty into the actual TOF measurements. To eliminate this inaccuracy and uncertainty, in embodiments of the present invention, the inherent delay of the system electronics is calibrated by measuring the apparent delay in the time of arrival of stray light pulses (i.e., the delay between each electrical pulse that is input to the transmitter and the corresponding pulse that is output from the receiver in response to the stray light, as explained above). This measurement provides a baseline delay, which is then subtracted from the actual TOF measurements in order to correct for the inherent delay of the electronics. The resulting calibrated TOF measurements will thus accurately reflect the optical time of flight—and hence the actual distance—to surfaces in the scene. The calibration may be updated dynamically during operation of the scanning head in order to account and correct for changes in the baseline delay over time.

The approach adopted by embodiments of the present invention is advantageous, inter alia, in that it can make use of existing components—including the light transmitter and the photodetector—in order to perform calibration functions, and requires essentially no additional hardware. This approach thus enhances the accuracy of the scanning head, using signals that are normally regarded as "noise," at almost no added cost. Although one embodiment is described in detail hereinbelow with reference to the design of a particular sort of sensing device that is used in a scanning head in the specific context of 3D mapping, the principles of the present invention may similarly be applied to other types of sensing devices and scanners, for both 3D mapping and other applications.

Figure 1:
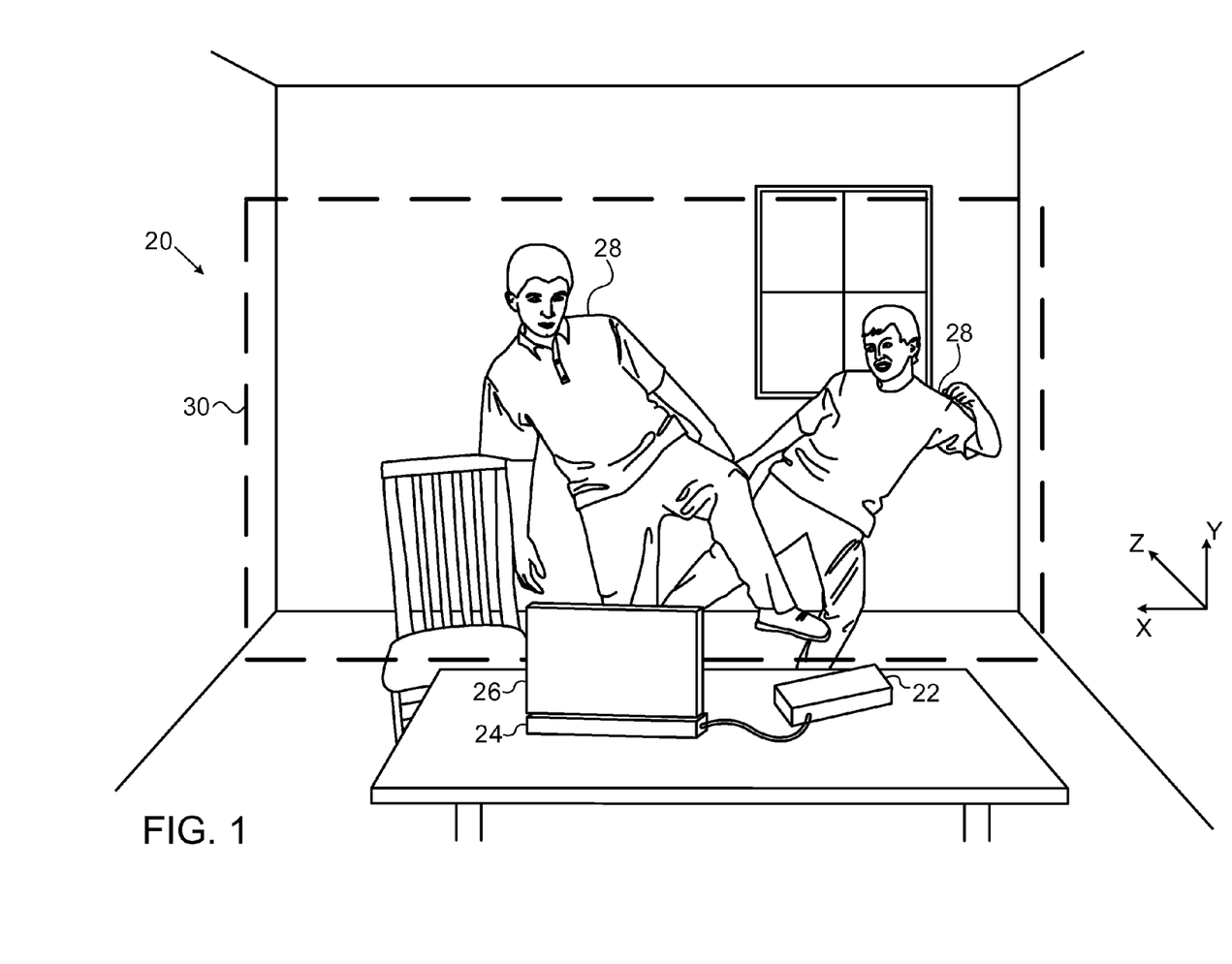
FIG. 1 is a schematic, pictorial illustration of a depth mapping system, in accordance with an embodiment of the present invention.

FIG. 1 is a schematic, pictorial illustration of a depth mapping system 20, in accordance with an embodiment of the present invention. The system is based on a scanning depth engine 22, which captures 3D scene information in a volume of interest (VOI) 30 that includes one or more objects. In this example, the objects comprise at least parts of the bodies of users 28. Engine 22 outputs a sequence of frames containing depth data to a computer 24, which processes and extracts high-level information from the map data. This high-level information may be provided, for example, to an application running on computer 24, which drives a display screen 26 accordingly.

Computer 24 processes data generated by engine 22 in order to reconstruct a depth map of VOI 30 containing users 28. In one embodiment, engine 22 emits pulses of light while scanning over the scene and measures the relative delay of the pulses reflected back from the scene. A processor in engine 22 or in computer 24 then computes the 3D coordinates of points in the scene (including points on the surfaces of the users' bodies) based on the time of flight of the light pulses at each measured point (X,Y) in the scene. This approach gives the depth (Z) coordinates of points in the scene relative to the location of engine 22 and permits dynamic zooming and shift of the region that is scanned within the scene. Implementation and operation of the depth engine are described in greater detail in the above-mentioned U.S. Patent Application Publication 2013/0207970.

Although computer 24 is shown in FIG. 1, by way of example, as a separate unit from depth engine 22, some or all of the processing functions of the computer may be performed by a suitable microprocessor and software or by dedicated circuitry within the housing of the depth engine or otherwise associated with the depth engine. As another alternative, at least some of these processing functions may be carried out by a suitable processor that is integrated with display screen 26 (in a television set, for example) or with any other suitable sort of computerized device, such as a game console or media player. The sensing functions of engine 22 may likewise be integrated into computer 24 or other computerized apparatus that is to be controlled by the depth output.

For simplicity and clarity in the description that follows, a set of Cartesian axes is marked in FIG. 1. The Z-axis is taken to be parallel to the optical axis of depth engine 22. The frontal plane of the depth engine is taken to be the X-Y plane, with the X-axis as the horizontal. These axes, however, are defined solely for the sake of convenience. Other geometrical configurations of the depth engine and its volume of interest may alternatively be used and are considered to be within the scope of the present invention.

Scanner designs and other details of the depth engine that support the above sorts of schemes are described with reference to the figures that follow.

Figure 2:
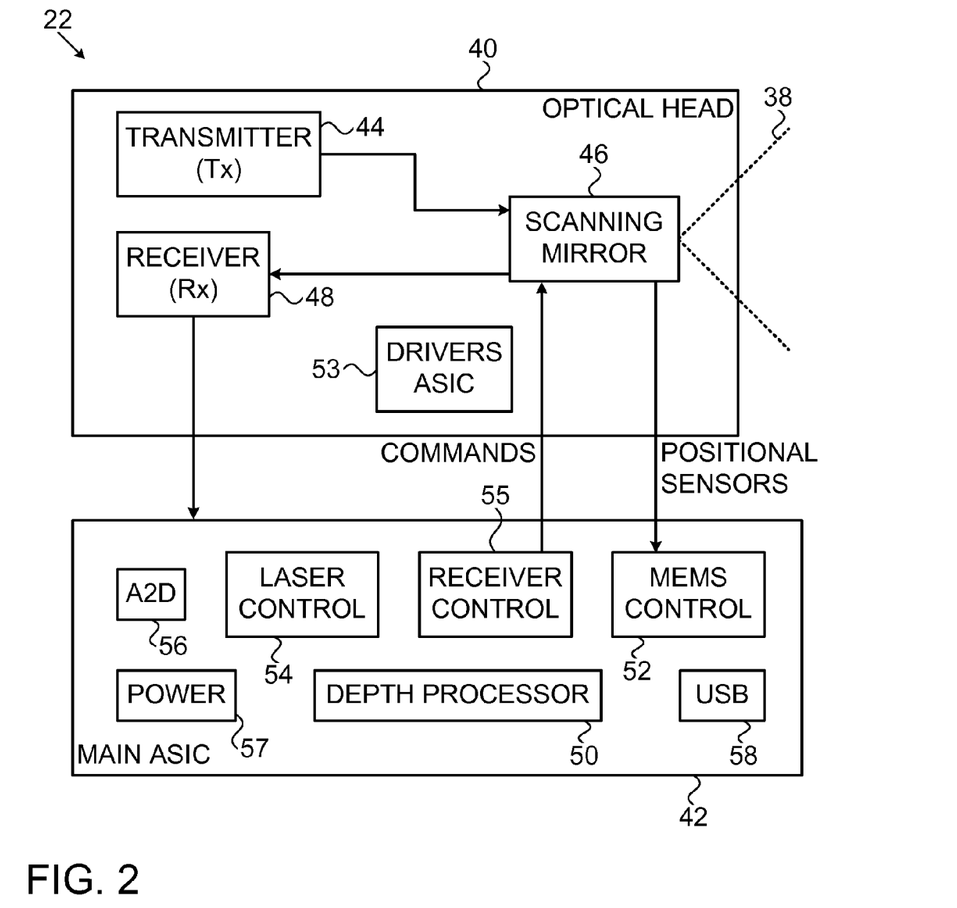
FIG. 2 is a block diagram that schematically shows functional components of a depth engine, in accordance with an embodiment of the present invention.

FIG. 2 is a block diagram that schematically shows functional components of depth engine 22, in accordance with an embodiment of the present invention. Engine 22 comprises an optical head 40, which serves as the sensing device of the depth engine, and a controller 42 (also referred to as a processor), which may be implemented as an application-specific integrated circuit (ASIC), as indicated in the figure.

Optical head 40 comprises a transmitter 44, such as a laser diode, whose output is collimated by a suitable lens. Transmitter 44 outputs a beam of light, which may comprise visible, infrared, and/or ultraviolet radiation (all of which are referred to as "light" in the context of the present description and in the claims). A laser driver, which may similarly be implemented in an ASIC 53, modulates the laser output, so that it emits short pulses, typically with sub-nanosecond rise time. The laser beam is directed toward a scanning micromirror 46, which may be produced and driven using MEMS technology, as described in the above-mentioned U.S. Patent Application Publication 2013/0207970. The micromirror scans a beam 38 over the scene, possibly via projection and collection optics, such as a suitable lens (not shown).

Pulses of light reflected back from the scene reflect from scanning mirror 46 onto a receiver 48. (Alternatively, in place of a single mirror shared by the transmitter and the receiver, a pair of synchronized mirrors may be used.) The receiver typically comprises a sensitive, high-speed photodetector, such as an avalanche photodiode (APD), along with a sensitive amplifier, such as a transimpedance amplifier (TIA), which amplifies the electrical pulses output by the photodetector. These pulses are indicative of the times of flight of the corresponding pulses of light.

The pulses that are output by receiver 48 are processed by controller 42 in order to extract depth (Z) values as a function of scan location (X,Y). For this purpose, the pulses may be digitized by a high-speed analog/digital converter (A2D) 56, and the resulting digital values may be processed by depth processing logic 50. The corresponding depth values may be output to computer 24 via a USB port 58 or other suitable interface.

Typically, a given projected light pulse will result in (at least) two reflected light pulses that are detected by receiver 48—a first pulse due to stray light reflected from a surface or surfaces in or associated with optical head 40, followed by a second pulse reflected from a surface of an object in VOI 30. Logic 50 is configured to process both pulses, giving two corresponding delay values (baseline and actual object) at the corresponding pixel. These dual delay values may be used by logic 50 (or alternatively by computer 24) in calibrating the actual object delays and thus generating a more accurate depth map of the scene.

Controller 42 also comprises a power converter 57, to provide electrical power to the components of engine 22, and components that control the transmit, receive, and scanning functions of optical head 40. For example, a MEMS control circuit 52 in controller 42 may direct commands to the optical head to modify the scanning ranges of mirror 46. A laser control circuit 54 and a receiver control circuit 55 likewise control aspects of the operation of transmitter 44 and receiver 48, such as amplitude, gain, offset, and bias. Position sensors associated with the scanning mirror, such as suitable inductive or capacitive sensors (not shown), may provide position feedback to the MEMS control function. Additionally or alternatively, reflections from a diffraction grating on mirror 46 may be sensed and processed in order to verify proper operation of the scanner and/or to calibrate the angular scale and speed of the scan, as described in the above-mentioned U.S. Patent Application Publication 2013/0250387.

Figure 3:
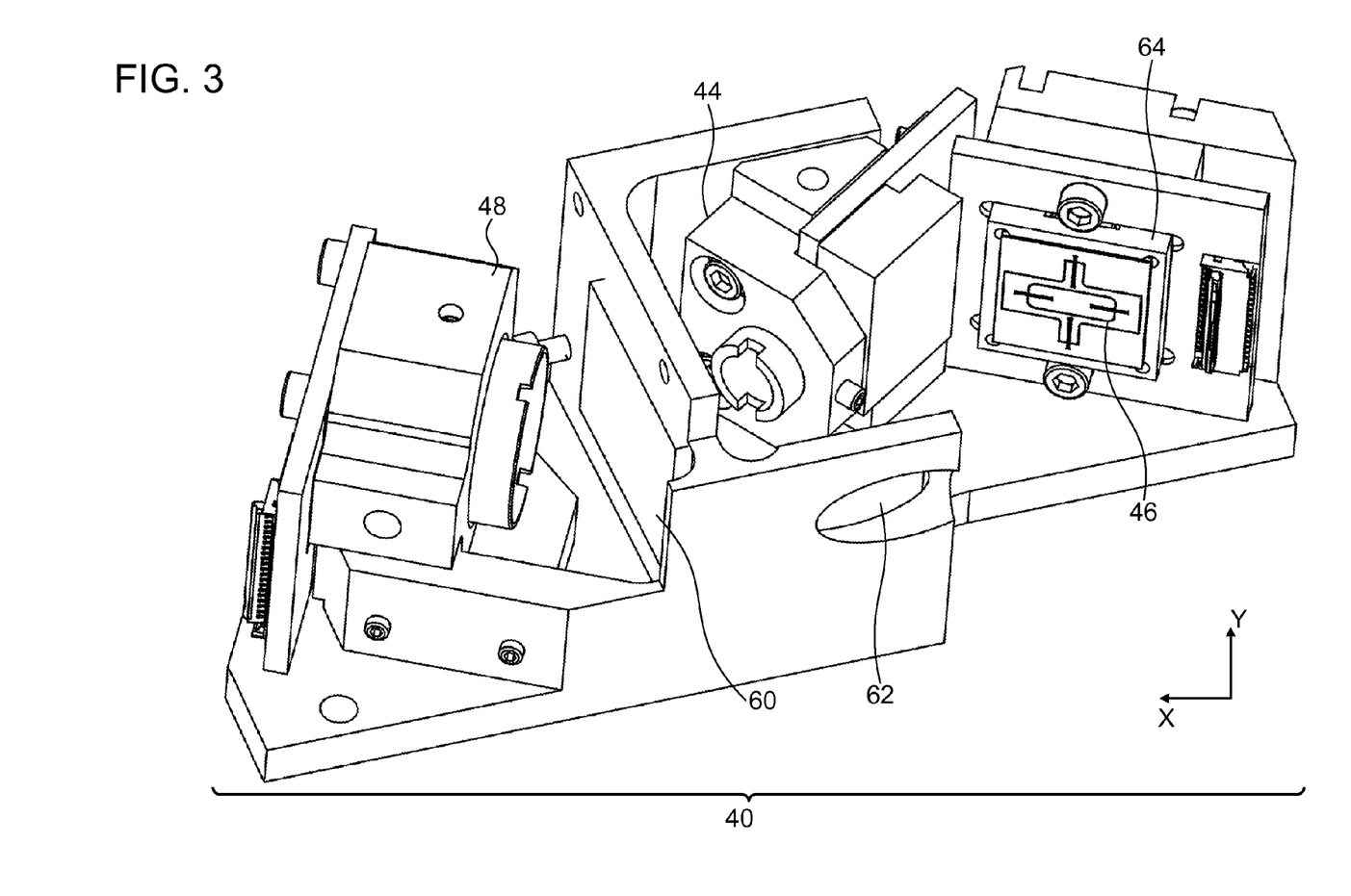
FIG. 3 is a schematic, pictorial illustration of an optical scanning head, in accordance with an embodiment of the present invention.

FIG. 3 is a schematic, pictorial illustration showing elements of optical head 40, in accordance with an embodiment of the present invention. Transmitter 44 emits pulses of light toward a polarizing beamsplitter 60. Typically, only a small area of the beamsplitter, directly in the light path of transmitter 44, is coated for reflection, while the remainder of the beamsplitter is fully transparent (or even anti-reflection coated) to permit returned light to pass through to receiver 48. The light from transmitter 44 reflects off beamsplitter and is then directed by a folding mirror 62 toward scanning micromirror 46. A MEMS scanner 64 scans micromirror 46 in X- and Y-directions with the desired scan frequency and amplitude.

Details of the micromirror and scanner are described in the above-mentioned U.S. Patent Application Publication 2013/0207970. Scanner 64 may be produced and operate on principles similar to those described in the above-mentioned U.S. Pat. No. 7,952,781, modified to enable two-dimensional scanning of a single micromirror 46. Dual-axis MEMS-based scanners of this type are described further in PCT Patent Application PCT/IB2013/056101, filed Jul. 25, 2013 (published as WO 2014/016794), which is incorporated herein by reference. Alternative embodiments of the present invention, however, may use scanners of other types that are known in the art, including designs that use two single-axis scanners (such as those described in U.S. Pat. No. 7,952,781, for example).

Light pulses returned from VOI 30 strike micromirror 46, which reflects the light via turning mirror 62 through beamsplitter 60. Receiver 48 senses the returned light pulses and generates corresponding electrical pulses. To enhance sensitivity of detection, the overall area of beamsplitter 60 and the aperture of receiver 48 are considerably larger than the area of the transmitted beam, and the beamsplitter is accordingly patterned, i.e., the reflective coating extends over only the part of its surface on which the transmitted beam is incident. The reverse side of the beamsplitter may have a bandpass coating, to prevent light outside the emission band of transmitter 44 from reaching the receiver. It is also desirable that micromirror 46 be as large as possible, within the inertial constraints imposed by the scanner. For example, the area of the micromirror may be about 3-30 mm$^2$.

The specific mechanical and optical designs of the optical head shown in FIG. 3 are described here by way of example, and alternative designs implementing similar principles are considered to be within the scope of the present invention. Other examples of optoelectronic modules in which the principles of the present invention may be applied are described in the above-mentioned U.S. Patent Application Publication 2013/0207970.

Figure 4:
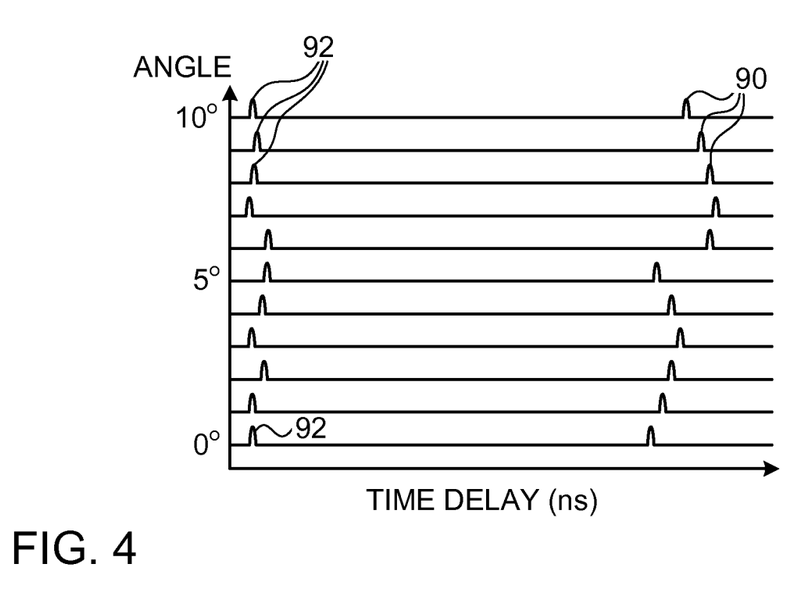
FIG. 4 is a schematic plot of signals output by a receiver in an optical scanning head, in accordance with an embodiment of the invention.

FIG. 4 is a schematic plot of signals output by receiver 48 during a scan of micromirror 46, in accordance with an embodiment of the invention. Each horizontal line in FIG. 4 corresponds to the signal output by receiver 48, as a function of time, in response to one light pulse emitted by transmitter 44 at time=0, as micromirror 46 scans in the Y-direction. For simplicity, the pictured example assumes the pulses to be emitted at scan intervals of 1°, although in practice the angular separation between successive pulses is generally smaller and may vary with time or other system parameters. Although this simplified plot shows only a single pulse corresponding to each distance measurement at each angle, in practice more complex patterns of pulses may be used, and the principles of the present invention are equally applicable regardless of the choice of such a pulse pattern.

Each of the light pulses is reflected back from a corresponding point in the scene being scanned by optical head 40, and the returning optical pulse causes receiver 48 to output an electrical pulse at a time indicated by a corresponding peak 90 at the right side of the figure. The time delay of each peak 90 (in nanoseconds) is indicative of the round-trip time of flight of the light pulse to and from the corresponding point in the scene, and hence of the distance of the point from the optical head.

In addition, a small part of the light in each pulse output by transmitter 44 reflects back to receiver 48 from one or more of the surfaces within or in proximity to optical head 40. (The term "in proximity" in this context may include, for example, other optical surfaces within depth engine 22, but generally not nearby objects in VOI 30.) These stray reflections may reach the receiver, for example, due to uncontrolled reflection and/or scattering from the surfaces of micromirror 46, beamsplitter 60 or folding mirror 62. Corresponding peaks 92, indicating the electrical pulses output by receiver 48 in response to these stray reflections, appear at the left side of the figure. The time delay of peaks 92 is very short, since the pulses return to receiver 48 directly, typically less than a nanosecond after being emitted from transmitter 44. Thus, the observed delay of peaks 92 actually reflects the inherent electronic delays within the circuits of depth engine 22, as explained above. Depth processing logic 50 may take the difference between the times of output of the pulses from receiver 48 due to the beam reflected from the scene and the pulses due to stray reflections by subtracting the duration of the delay of peaks 92 from the longer delay of peaks 90. This difference gives an accurate measure of the actual time of flight of the optical pulses, from which the electronic delays in depth engine 22 have been calibrated out.

The delays of stray light peaks 92 may vary with system conditions, such as temperature, but such delays are usually slowly varying, and therefore can be dealt with by suitable calibration in order to avoid degrading the quality of the position measurements. For example, logic 50 may compute a moving average of the delay of peaks 92 over a sequence of the optical pulses in order to filter out short-term jitter, and may then subtract this average delay from the measured delay of each peak 90 in order to give the desired calibrated TOF values.

The advantages of this approach are not limited to the specific device architecture that is shown in FIGS. 2 and 3, but may rather be used in other sorts of scanning systems, particularly (although not exclusively) MEMS-based scanning systems. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Sensing apparatus, comprising:
   a transmitter, which is configured to emit a beam comprising optical pulses toward a scene;
   a receiver, which is configured to receive reflections of the optical pulses and to output electrical pulses in response thereto;
   a scanner, comprising a scanning micromirror, which is configured to scan the beam over a scene, wherein the optical pulses are emitted and received at multiple angular positions of the scanner; and
   processing circuitry, which is coupled to the receiver so as to receive, in response to each of at least some of the optical pulses emitted by the transmitter, a first electrical pulse output by the receiver at a first time due to an uncontrolled stray reflection from a surface of the scanning micromirror within the apparatus and a second electrical pulse output by the receiver at a second time due to the beam reflected from the scene, and to generate a measure of a time of flight of the optical pulses to and from points in the scene by taking a difference between the respective first and second times of output of the first and second electrical pulses.

2. The apparatus according to claim 1, wherein the processing circuitry is configured to generate a depth map of the scene responsively to the time of flight of the optical pulses.

3. The apparatus according to claim 1, wherein the first time is indicative of an inherent delay of the receiver in generating the electrical pulses in response to the arrival of the optical pulses, and wherein the processing circuitry is configured to calibrate the time of flight in order to correct for the inherent delay.

4. The apparatus according to claim 3, wherein the processing circuitry is configured to compute a moving average of the difference between the respective first and second times over a sequence of the optical pulses, and to calibrate the time of flight using the computed average.

5. A method for optical sensing, comprising:
   transmitting a beam comprising optical pulses from a sensing device toward a scene;
   receiving reflections of the optical pulses in the sensing device;
   scanning the beam over a scene by reflection from a scanning micromirror, whereby the optical pulses are emitted and received at multiple angular positions relative to the scene;
   outputting electrical pulses from the sensing device in response to the received reflections, the electrical pulses comprising, in response to each of at least some of the transmitted optical pulses, a first electrical pulse output by the sensing device at a first time due to an uncontrolled stray reflection from a surface of the scanning micromirror within the sensing device and a second electrical pulse output by the sensing device at a second time due to the beam reflected from the scene; and
   generating a measure of a time of flight of the optical pulses to and from points in the scene by taking a difference between the respective first and second times of output of the first and second electrical pulses.

6. The method according to claim 5, and comprising generating a depth map of the scene responsively to the time of flight of the optical pulses.

7. The method according to claim 5, wherein the first time is indicative of an inherent delay of the sensing device in generating the electrical pulses in response to the arrival of the optical pulses, and wherein generating the measure comprises calibrating the time of flight in order to correct for the inherent delay.

8. The method according to claim 7, wherein calibrating the time of flight comprises computing a moving average of the difference between the respective first and second times over a sequence of the optical pulses, and calibrating the time of flight using the computed average.

* * * * *